Inventor:
Thomas A. Banning, Jr.

Inventor:
Thomas A. Banning, Jr.

Inventor:
Thomas A. Banning, Jr.

United States Patent Office 3,310,624
Patented Mar. 21, 1967

3,310,624
SUBSCRIPTION TELEVISION SYSTEM USING PHASE INVERTED VIDEO SIGNALS

Thomas A. Banning, Jr., 5500–5520 S. Shore Drive, Apt. 1408, Chicago, Ill. 60637

Filed Aug. 8, 1963, Ser. No. 300,946
6 Claims. (Cl. 178—5.1)

Figure 1:
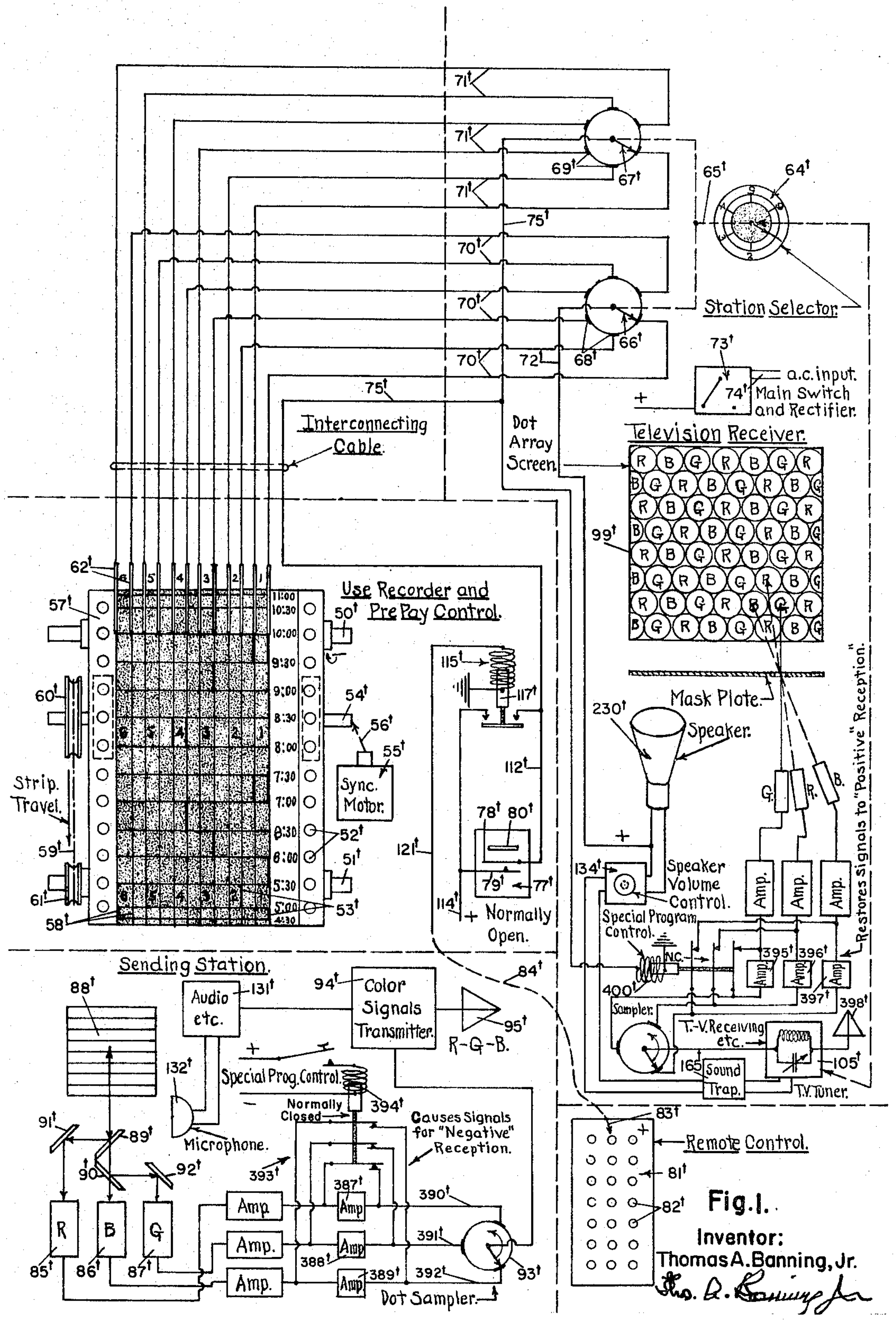

This invention relates to improvements in radio and television program selecting, and time of use recording. Specifically, the improvements hereinafter described concern themselves with means to produce signals at a sending station, corresponding to the viewing of an object or objects according to conventional television signal emitting practices, and for receiving and translating said signals in the receiver, also according to conventional practises; together with provisions for producing such receiving and translating operations in manner which includes provision for producing the translated picture in either of two grades of excellence, one of which translations, generally that of lesser grade of excellence, shall be translated and made visible to the viewer without prepay or other credit or like operation, and the other of which translations, that of higher grade of excellence, shall be produced to the viewing of the observer, only when pre-pay or other credit or remote control operation has been performed.

Still more specifically, the disclosures hereinafter described, include provision at the sending station for emitting the picture signals according to conventional elements and operations, either for monochrome picture translation, or for color picture translation, during the progress of an "ordinary" program, and for receiving and translating at the receiver, such signals, according to conventional elements and operations, to produce a conventional picture translation, either as monochrome or color, as the case may be, and depending on which kind of signals are being emitted by the sending station, monochrome or color; or, when the program being signal produced at the sending station, is what may be termed a "special" program, for emitting the picture signals under conditions which will result in production of a reduced grade of picture translation at the receiver, when pre-pay or remote control is not effected, but which picture translation at the receiver may be changed to the higher grade of translation, when either the pre-pay operation of the remote control operation, is performed.

Still more specifically, the present embodiments include provision for normally emitting the signals, either for monochrome or for color translation, as the case may be, under conditions which will result in reception and translation of such signals by the receiver, as a normal "positive" picture translation, without need of pre-pay or remote control, in monochrome or color as the case may be, depending on which class of signals are being emitted by the sending station; together with the provision of means to emit the picture signals under conditions which will result in the reception and translation of the received signals as a "negative" picture translation, when no pre-pay or remote control operation has been made; and provision for inverting the signal translation operations in the receiver, or as an operation ancillary to the receiver operation, to restore the picture translation to a "positive" translation, when the pre-pay or remote control operation has been performed.

By the terms "negative" and "positive" as herein used, I contemplate translations such that what should be dark portions of the translation will appear as light portions, and vice versa, what should appear as light portions of such translation will appear as dark portions; such a translation being a "negative" translation. Per contra, the "positive" translation will be one in which the portions properly to be translated as light, shall be translated as light, and vice versa, the portions properly to be translated as dark, shall be translated as dark. It will be evident that both such translations are fully intelligible since the contrasts between the light and the dark areas of both translations define readily identifiable objects to the observer. Thus, according to such definition, when the signals, whether for a monochrome translation, or for a color translation, are being emitted for an "ordinary" program, without need for pre-pay, such emitted signals are of a nature such that the normal and conventional operation of the receiver will receive and translate the signals as a "positive" translation, whether of monochrome or of color, and without pre-pay or remote control operation. But, when the signals, whether for a monochrome translation, or for a color translation, are being emitted for a "special" program, said signals as then emitted by the sending station will be received by the conventional receiver and translated to produce a "negative" translation, when no pre-pay or remote control has been produced, but by the pre-pay or remote control operation, the translating operations in the receiver will produce the desired "special" program in "positive" translation.

Specifically, the hereinafter described sending equipment is provided with means to reverse or invert the picture signals before they are emitted by the sending station antenna, so that the signals as thus reversed will produce, in the conventional receiver, a "negatived" or reversed picture translation. Such receiver is then provided, or there is provided ancillary to the receiver, means, under control of the pre-pay or remote control equipment, for causing the received signals to be reversed during the translating operation so that the picture produced to the observer will be a "positive" translation.

The presently disclosed embodiments also include recording means for producing records of the programs to which the receiver is tuned from time to time, and for also recording the times of starting and stopping such recordings; and when the program being received is a "special" program, for showing the times of starting and stopping such program reception. Such recordings will facilitate proper auditing and related operations to determine the distribution of payments and/or credits due to various sponsors of the "special" programs which have been tuned and received under the higher grade of translation.

Other objects and uses of the invention will appear from a detailed description of the same, which consists in the features of construction and combinations of parts hereinafter described and claimed.

Figure 2:
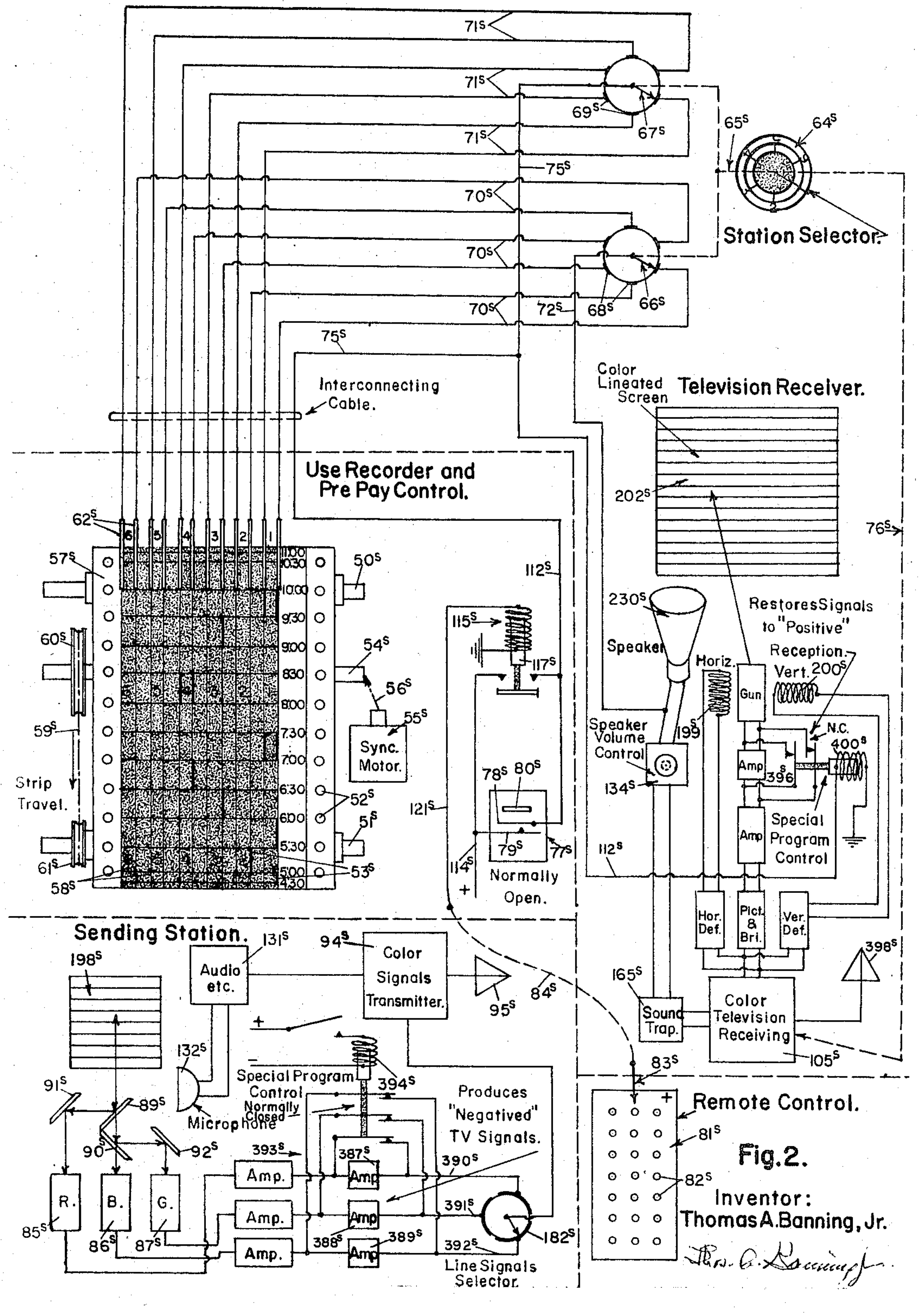
Figure 3:
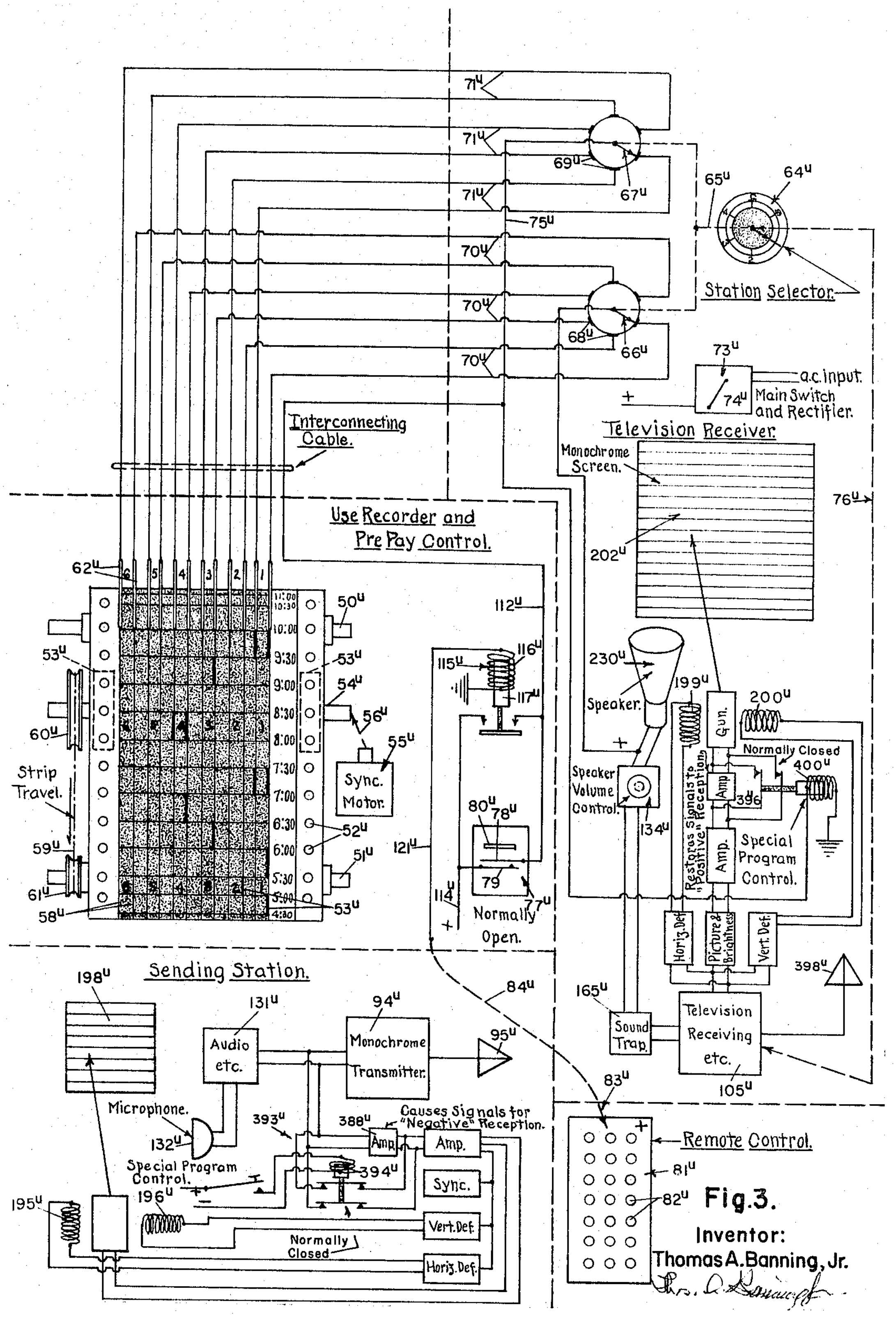

In the drawings:

FIGURE 1 shows more or less schematically, a sending station for emitting color signals according to the three color dot array principle, together with accompanyin gaudio signals, under conventional operation; together with means to invert such picture signals when a "special" program is to be emitted from the antenna, and for restoring the normal conventional operation when an "ordinary" program is to be emitted; and this figure also shows a simple form of receiving equipment for receiving and translating the picture signals, either in the phase condition in which they are received from the antenna, or with inversion of the received picture signals so that their translation, and the production of the picture to viewing of the observer, shall be an inverted replica of the signals as such signals are received by the antenna; together with pre-pay or remote control means to produce the inversion of the received signals, when the program being emitted by the sending station is a "special" program, and when proper pre-pay or remote control operation has been made; and this figure also shows means to make a record of the various programs received and tuned, and of the stations from which such programs are emitted, and the times of starting and stopping such tuned condition;

FIGURE 2 shows an embodiment of the invention similar to that shown in FIGURE 1 but with the difference that the embodiment shown in FIGURE 2 is for emission and reception and translation of color picture signals according to the color lineation principle instead of the three color dot array principle, and the embodiment shown in FIGURE 2 includes a single electron gun instead of the three gun arrangement shown in FIGURE 1; and FIGURE 3 shows an embodiment similar to that shown in FIGURE 2 but with the difference that the embodiment shown in FIGURE 3 is for emission and reception and translation of monochrome picture signals instead of color signals.

Referring first to FIGURE 1, the sending station there schematically shown includes the conventional camera means for delivering signals corresponding to the primary colors contained in the light reflected from successive elemental areas of the object as scanned by such camera. Such showing also includes the dot sampler 93$^t$, and the color signals transmitter 94$^t$, delivering its signals to the sending antenna 95$^t$ according to conventional practise. Provision is also schematically shown for inclusion in the signals emitted by the antenna, of audio signals comprising a portion of the program being signalled.

The receiver schematically shown in FIGURE 1 includes the conventional three gun kinescope arrangement for producing on the excitable screen of such kinescope, illuminations of elemental areas of successive three color dot arrays corresponding to the signals received at the receiver antenna, and translated in the receiver, according to conventional operations. The schematic showing of the receiver also includes the conventional means to tune the selected station or channel, the sound trap for delivering the audio signals to the speaker, and the speaker for translating such audio signals.

The signal producing elements and the circuitry of the sending station, and the signal translating elements and the circuitry of the receiver, are conventionally of such characteristics that the brightness of illumination produced at each elemental area of the kinescope viewing screen corresponds to the brightness of the corresponding elemental area viewed by the camera. Thus, conventionally, a true "positive" translation of the appearance of the object viewed by the camera is produced on the raster developed on the kinescope viewing screen. Thus also, a bright elemental area is produced on the viewing screen corresponding in brightness to that elemental area of the object then being viewed by the camera of the sending station; bright elemental areas of the viewed object being simulated by the brightness produced on the elemental areas of the viewing screen, which viewing screen elemental areas correspond to the elemental areas of the viewed object. Likewise, when such true "positive" translation of the appearance of the object viewed by the camera, is produced on the raster developed on the kinescope viewing screen, the darker elemental areas of the appearance of the viewed object are simulated by corresponding darker elemental areas of illumination produced on the viewing screen.

The improvements herein disclosed are such that, when a "special" program is being signalled by the sending station, the signals then being emitted are reversed in phase intensity at such sending station (or are otherwise modified), in such manner that such reversed or modified signals, when received and translated by the conventional receiver, will produce a "negative" raster instead of a "positive" raster, produced when such reversal or modification of the emitted signals is not produced. Thus, a truly intelligible interpretation of the received picture signals is produced, but, being a "negative" picture instead of a "positive" picture, such interpretation is not of the higher grade interpretation which may be desired by the viewer. Thus the improvements herein disclosed include means under control of the sending station operator, for producing reversal of the phase intensity of the emitted signals, during emission of a selected program, herein defined as a "special" program.

The present improvements also include means under control of the person operating the receiver (or under a remote control operation), for producing in such receiver a reversal of the phase intensity of the translation of the received picture signals, so that when thus reversed, the picture translation produced as a raster on the viewing screen will be a "positive" translation, and a true translation of the appearance of the viewed object instead of a "negative" translation of such appearance. Said receiver improvements also include the provision of means such that the phase intensity translation reversing means may be effectively operated only by production of a prepay operation, or by a remote control operation, provided for such receiver. Accordingly, when such a "special" program is being emitted by the sending station, the viewer may receive the picture translation thereof as a "positive" picture translation only by making the proper pre-pay operation, or having the needed remote control operation made at the remote control location. The phase intensity reversal means provided in the sending station schematic showing, and the phase intensity reversal means provided in the schematic showing of the receiver, are as follows:

The phase intensity reversers 387$^t$, 388$^t$ and 389$^t$ are included in the lines 390$^t$, 391$^t$ and 392$^t$ leading to the dot sampler 93$^t$. These reversers may be of conventional form, such as amplifiers which produce phase reversal from their input terminals to their output terminals. Accordingly, when the signals reaching the lines 390$^t$, 391$^t$ and 392$^t$ have passed through such reversers their phase intensities have been reversed, and the signals reach the sampler in such intensity reversed condition. Accordingly, the signals transmitted to the color signals transmitter unit 94$^t$ will also be of intensity reversed form. During normal operation of the sending station, to emit the signals in non-phase intensity reversed condition, I have provided the switching unit 393$^t$, having the three movable contacts corresponding to the three lines 390$^t$, 391$^t$ and 392$^t$, together with bridging lines connected to such movable contacts and the stationary contacts matching them, so that by normally holding the movable contacts in their closed circuit positions, shown in FIGURE 1, the several units 387$^t$, 388$^t$ and 389$^t$ are bridged, and the signals pass to the dot sampler without intensity phase reversal. The movable contacts of such switching unit are under control of the solenoid 394$^t$, so that by energizing such solenoid the several movable contacts may be moved to open circuit condition and retained in such condition during the progress of the "special" program, thus removing the by-passes from the several units 387$^t$, 388$^t$ and 389$^t$. Accordingly, during such "special" program the signals emitted for the picture component of the program will be reversed, and, in the absence of the proper pre-pay or remote control operation, the picture translation translated will be a "negative" translation to the observer.

The receiver is also provided with the phase intensity reversers 395$^t$, 396$^t$ and 397$^t$ in the lines leading to the three electron guns so that the phase intensity reversed signals from the receiving antenna 398$^t$ will be reversed as they reach the guns, to produce a set of signals of corrected reversal, to produce the picture as a "positive" translation, notwithstanding the fact that the signals received by the antenna of the receiver were of phase intensity reversed form. The units 395$^t$, 396$^t$ and 397$^t$ may, however, be bridged by the movable contacts of the switching unit 399$^t$, which switch is controlled by the solenoid 400$^t$. Such solenoid is normally un-energized, so that the units 395$^t$, 396$^t$ and 397$^t$ remain normally bridged, under which condition the translation of the picture will be directly according to the condition of the signals received by the receiver antenna. By energizing the solenoid 400$^t$ when phase intensity reversed signals are being received from the sending station, such switching unit will move its contacts to their open circuit positions, thus causing the signals to flow through the units 395$^t$, 396$^t$ and 397$^t$ with phase intensity reversed into corrected condition to produce a "positive" picture translation. Thus, energization of the switch position at the sending station, followed by reversal of the switch position at the receiver, will enable reception of the translated picture as a "positive" translation, notwithstanding that the signals emitted by the sending station were of reversed phase intensity.

The energization of the solenoid 400$^t$ may be produced either by pre-pay at the unit 77$^t$, or by remote control at the remote control station 81$^t$. When the unit 77$^t$ is a time limit pre-pay unit, the energization of the switch solenoid 400$^t$ will terminate at conclusion of the time for which pre-pay has been made.

The embodiment shown in FIGURE 2 is similar to that shown in FIGURE 1 and described above, with the exception that the embodiment of FIGURE 2 is one in which the color signals are emitted for full lateral scans of the raster for each color, and corresponding translation of full scan color lineations in producing the picture translation. Accordingly, detailed description of FIGURE 2 is unnecessary, and various of the elements shown in FIGURE 2 are identified by the same numerals as identify corresponding elements of FIGURE 1, but with the suffix "*s*" in the showing of FIGURE 2. It is also noted that the showing of FIGURE 2 is one in which the translations for production of the picture include operations of a single electron gun in place of the three gun arrangement shown in FIGURE 1.

The embodiment shown in FIGURE 3 is for the emission of picture signals for monochrome translation in the receiver. Accordingly, this embodiment of FIGURE 3 includes a single camera for initiating the picture signals without need of discriminating between the signals for the three colors. Likewise the elements shown in the schematic showing of the monochrome receiver are correspondingly simplified. Elements shown in FIGURE 3 which correspond to elements shown in FIGURES 1 and 2, are identified by numerals of the same kind, but carrying suffixes "*u*" instead of "*t*" or "*s*".

It is also noted that in each of the embodiments of FIGURES 1, 2 and 3, provision has been included for producing a record of the tuning of each of the sending stations for which provision has been made, and for also enabling identifying the tuning of "special" programs, with station identification corresponding to the sending stations emitting such "special" programs. Since such recording arrangements have been described in full detail in Letters Patent, No. 3,070,652, issued to me on December 25, 1962, and also fully disclosed in various other applications for Letters Patent of the United States, filed by me, it is not necessary to describe the same in detail here. It is, however, noted that in each of the embodiments of FIGURES 1, 2 and 3, provision is made for causing the recording equipment to function for production of a time record of the tuning of each "special" program, only when proper pre-pay or remote control operation to receive such "special" program in its higher quality translation, being, in the present case, that picture production which is the "positive" translation, is being produced.

It is to be noted that in each of FIGURES 1, 2 and 3 the switches 393 at the sending station, and the switches 400 in the receiver, are shown in their closed positions, so that the units 387, 388 and 389 of the sending station, and the units 395, 396 and 397 of the receiver are normally bridged, being the normal condition (as illustrated) for ordinary or non-"special" program operation. Such closed conditions may be produced by the springiness of the movable contact leaves of such switching elements. Then the bridging operation is discontinued only as long as the switch operating solenoids are energized.

It is also to be noted that, if desired, all of such switches may normally be retained in their open circuit positions, in which case the solenoid operations would be reversed, to close the switches during a "special" program. In any case, when the arrangement is one under which the "ordinary" programs are emitted and properly translated by the receiver when the sending station switch is in a given position, and the receiver switch is in a given position, the reversing of the sending station switch without reversing of the receiver switch will result in translation of the picture as a "negative" picture, so that such reversing of the sending station switch must be followed by a reversing of the receiver switch, to produce on the picture screen, a translation of "positive" quality. In each of the illustrated embodiments such reversing of the receiver switch is accomplished by the proper prepay operation, or by the proper remote control operation.

I claim:

1. In a prepay or subscription television system, the combination of a sending station including television camera means constituted to scan an object to be televised, and constituted to emit video signals of said object translatable for production of either an inferior aesthetic quality fully intelligible raster or a superior aesthetic quality fully intelligible raster, selectively under manual control of the receiver operator, said video signal emitting means including means to produce signals corresponding in strength and phase intensity to the brightness of elemental areas of said object successively viewed by the signal producing means according to a pre-determined spatial and time pattern, said sending station including means to emit signals which correspond in spatial and time pattern to said so produced signals and including connections between the signal producing means and the signal emitting means, said connections including phase intensity inverting means having a first defined phase intensity non-inverting position and a second defined phase intensity inverting position, together with a receiver having means to receive the signals emitted by the signal emitting means, and also having a picture screen and means to produce on said screen a raster comprising illumination of an elemental area, means to cause said illuminated area producing means to produce the illumination of successive elemental areas of the raster according to the spatial and time pattern the same as the spatial and time pattern viewing of the elemental areas of the object viewed by the signal producing means of the camera; means in the receiver to control the illuminated area producing means to control the brightness of the illumination of the elemental area, and connections between the means which receives the signals emitted by the signal emitting means of the sending station, and the elemental area brightness control means of the receiver, said connections including phase intensity inverting means having a first defined phase intensity non-inverting position constituted to produce the raster from the inverted phase intensity of the received inverted signals emitted by the sending station without re-inversion of said video signals, and with production of an inferior aesthetic quality fully intelligible translation of said signals, and a second defined phase intensity inverting position constituted to produce the raster from the inverted phase intensity of the received inverted signals emitted by the sending station with re-inversion of said video signals, and production of a superior aesthetic quality fully intelligible translation of said signals, together with manual control means to select either the first defined position or the second defined position of said phase intensity inverting means.

2. A television system as defined in claim 1, wherein the phase intensity reversing means of the sending station and the phase intensity reversing means of the receiver are constituted to cause the illuminated area producing means of the receiver to control the brightness of the illumination of each elemental area of the raster for production of such brightness proportional to the brightness of the corresponding elemental area of the object viewed by the signal producing means of the sending station camera, when the phase intensity reversing means of the sending station and the phase intensity reversing means of the receiver are both in their first defined positions or their second defined positions; and to cause the illuminated area producing means of the receiver to control the brightness of the illumination of each elemental area of the raster for production of such brightness inversely proportional to the brightness of the corresponding elemental area of the object viewed by the signal producing means of the sending station camera, when one phase intensity reversing means is in its first defined position and the other phase intensity reversing means is in its second defined position.

3. A television system as defined in claim 2, wherein the manual control means is constituted to cause the phase intensity reversing means of the receiver to be the same as the defined position as the position of the phase intensity reverser of the sending station.

4. A television system as defined in claim 1, wherein the manual control means comprises pre-pay means constituted to select the second defined phase reversing position of the phase intensity reversing means of the receiver when the prepay means is activated.

5. A television system as defined in claim 1, wherein the manual control means comprises remote control means constituted to select the second defined phase reversing position of the phase intensity reversing means of the receiver when the manual control means is activated.

6. A television system as defined in claim 1, wherein the camera means is constituted to produce signals corresponding in strength and phase intensity to the brightness of the primary colors at the elemental areas of the object viewed, and wherein the means which produces on the picture screen a raster comprises color raster producing means.

References Cited by the Examiner

UNITED STATES PATENTS 2,510,046 5/1950 Ellett ............... 178—5.1

DAVID G. REDINBAUGH, *Primary Examiner.*

H. W. BRITTON, *Assistant Examiner.*